(No Model.) 3 Sheets—Sheet 1.
O. ZWIETUSCH.
APPARATUS FOR FILTERING AND FILLING LIQUIDS UNDER PRESSURE.
No. 398,109. Patented Feb. 19, 1889.
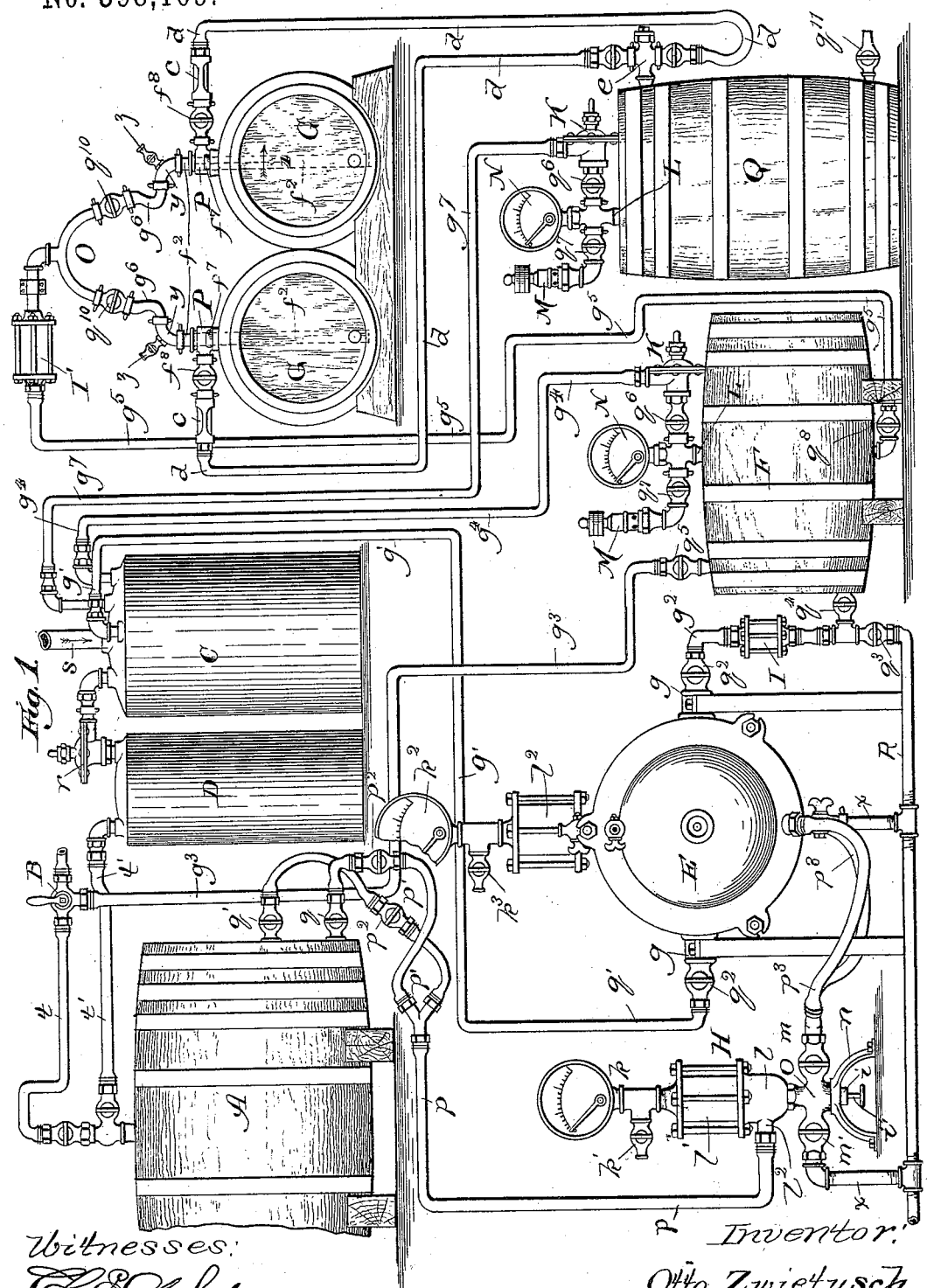
Witnesses:
Chas. E. Gaylord.
J. W. Dyrenforth.
Inventor:
Otto Zwietusch
By Dyrenforth & Dyrenforth
Attys.

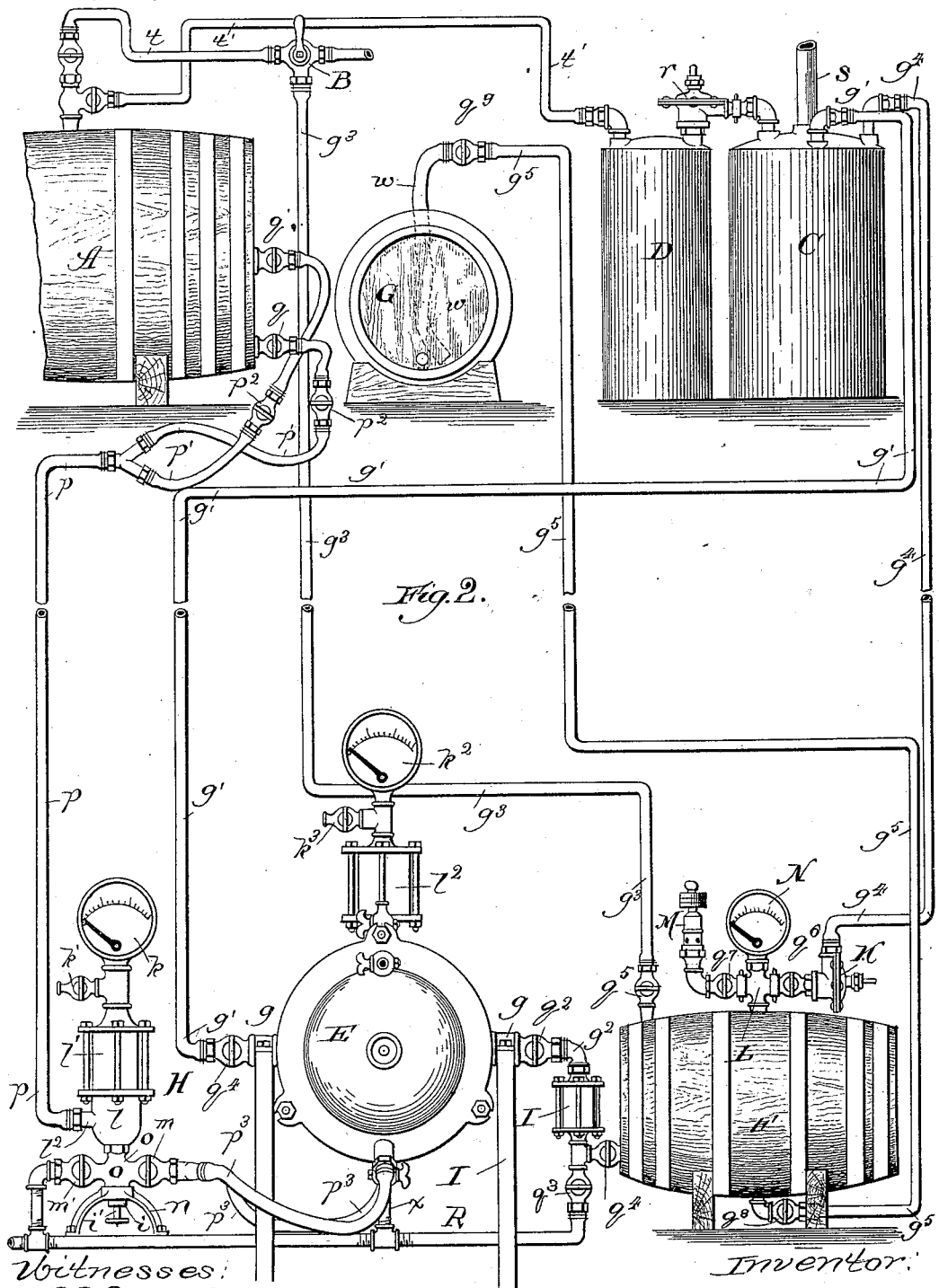

(No Model.) 3 Sheets—Sheet 3.
O. ZWIETUSCH.
APPARATUS FOR FILTERING AND FILLING LIQUIDS UNDER PRESSURE.
No. 398,109. Patented Feb. 19, 1889.
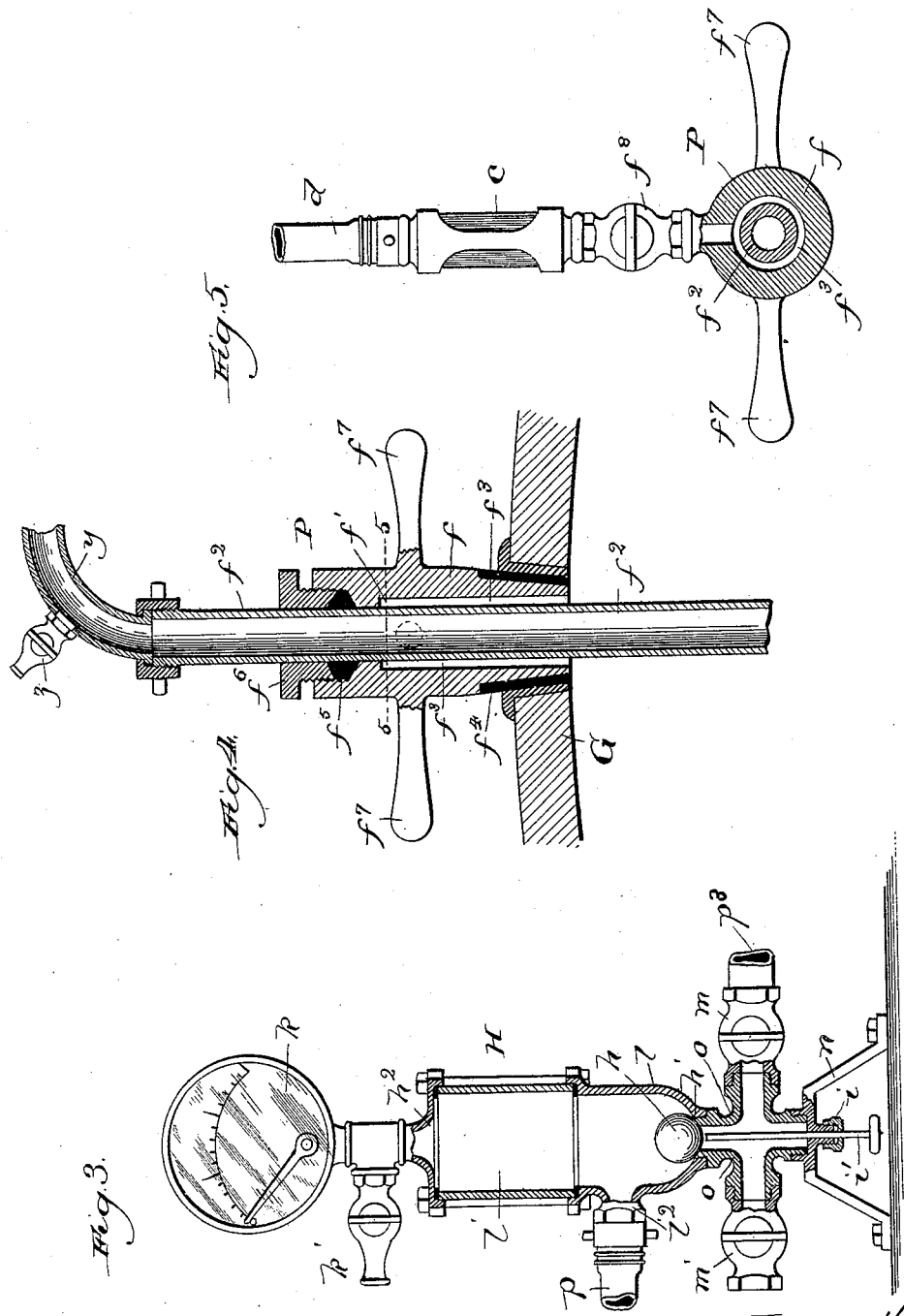

UNITED STATES PATENT OFFICE.

OTTO ZWIETUSCH, OF MILWAUKEE, WISCONSIN.

APPARATUS FOR FILTERING AND FILLING LIQUIDS UNDER PRESSURE.

SPECIFICATION forming part of Letters Patent No. 398,109, dated February 19, 1889.

Application filed January 12, 1888. Serial No. 260,473. (No model.)

*To all whom it may concern:*

Be it known that I, OTTO ZWIETUSCH, a citizen of the United States, residing at Milwaukee, in the county of Milwaukee and State of Wisconsin, have invented a new and useful Improvement in Apparatus for Filtering and Filling Liquids Under Pressure, of which the following is a specification.

Many features of my apparatus may be applied with advantage to liquids under pressure generally, more particularly gaseous liquids; but the apparatus as a whole is especially designed for the filtering and filling of beer, and I shall therefore describe it as applied to that beverage.

In the modern art of brewing, the beer, after passing through the main fermentation in open vats and the aging process in the "ruh" or storage-casks, undergoes a finishing process in so-called "shavings-casks," which are large casks similar to the storage-casks, but containing shavings of beech or other soft wood to aid the clarifying and settling. The beer is drawn from the storage-casks into the shavings-casks when it becomes desirable to finish it for the market. The operation of brewing has been virtually completed at the time the beer leaves the storage-casks; but at this stage the beverage lacks the life and brilliancy which the modern art demands, and it is to impart to it these qualities that the finishing process in the shavings-casks is employed. This finishing process consists in introducing into the shavings-casks containing the beer fermenting-wort or "kraeusen" from the open vats in which the beverage is undergoing the first or main fermentation, which excites a fresh and active fermentation in the shavings-casks, generating carbonic-acid gas in large quantities. In time this new fermentation in a measure subsides, and as a final step gelatinous matter, called "finings," is introduced at the bung-hole, which matter dissolves and spreads, and, being of greater specific gravity than the liquid, settles to the bottom, carrying with it the floating impurities which are the cause of turbidity, and, imprisoning them among the shavings, aids in retaining them there, leaving the beverage comparatively clear. A sufficient pressure of carbonic-acid gas is retained in the cask to impart to the beer the degree of effervescence requisite for appearance and palatability, and it is then in condition for the market. Of late years so-called "bunging" apparatuses have been largely employed as an aid to the finishing process. In its simplest form the bunging apparatus consists of a pressure-relief valve attached to the bung-hole of the cask and adapted to retain in the cask a certain pressure of carbonic-acid gas (usually from six to seven pounds) and allow the surplus to escape. In more elaborate and approved forms of the bunging apparatus several casks are separately connected to a common conduit leading to the pressure-relief valve, which thus serves for the whole series. The casks of the series being thus connected preserve, by intertransfusion, a uniform pressure equal to the resistance of the pressure-relief valve, which is sometimes in the form of a mechanical safety-valve and sometimes in the form of a water column. The bunging apparatus is applied by some brewers to the cask immediately upon the introduction of the kraeusen and by others at a later period after the beer has been allowed to work out through the bung-hole for a few days. Bunging apparatuses have been found highly useful in the art, and are now to be seen in one form or another in a great majority of the breweries of the United States, though not in all. Where a bunging apparatus exists in the connected-cask form, which is now a very well-known device in the art, it may be utilized to great advantage in my filtering and filling apparatus, though it is not indispensable, as will hereinafter appear.

The beer having been finished as above described, it is ready for racking for the market—that is, transferring to kegs or bottles under pressure of compressed air from a reservoir injected upon the surface of the beer in the shavings-cask to prevent it from becoming impoverished of gas and unsettled by reason of the increased space occasioned by the outflow, and also to maintain a uniform pressure.

Formerly it was deemed satisfactory to clarify the beer by means of shavings and finings alone, as above described; but this method is somewhat uncertain and is expensive, owing principally to the large quantity of gelatinous material consumed. Hence, instead of conducting the process of clarification wholly within the shavings-cask and transferring the beer directly therefrom to the ultimate receptacle, it is now becoming customary to effect the clarification chiefly after the beer leaves the shavings-cask by passing it through a filter while it is on its way to the ultimate receptacle. This method has advantages over the former method not only by saving time and producing superior results in point of clearness, brilliancy, and purity in the beverage, but also in the matter of direct economy, since by it the use of finings and even of shavings may be wholly dispensed with, if desired. The operation of filtering the beer is one of considerable nicety, since it must be conducted with a carefully-regulated counter-pressure and in such a manner as to prevent foaming of the beer. It is to this last branch of the art that my present improvement relates.

In the accompanying drawings, Figure 1 is a view in elevation of my apparatus in its most elaborate form; Fig. 2, a similar view showing a modification; Fig. 3, an elevation, partly in section, of a detail; Fig. 4, a vertical section of the bung and tube employed for filling the kegs, and Fig. 5 a sectional view taken on the line 5 5 of Fig. 4.

A is the shavings-cask; B, the common conduit of the bunging apparatus; $t$, the usual pipe provided with a stop-cock leading from the bung of the cask to the common conduit B; C, the ordinary main air-reservoir, into which compressed air from a pump is forced through a pipe, $s$; D, the ordinary auxiliary air-reservoir, into which air from the main reservoir passes through a pressure-reducing valve, $r$, and $t'$ the usual air-pipe leading from the auxiliary air-reservoir into the bung of the cask, which is provided with a stop-cock to admit or shut off the supply of air. The pipe $t$ is connected to any cask of the series that is to be racked off.

E is a filter, through which the beer from the cask A flows into an intermediate vessel, F, in which a counter-pressure is maintained, and from which it passes to the ultimate receptacles G.

Any suitable filter may take the place of the filter E; but I prefer to employ the one of my own invention, which is represented in end elevation in the drawings, and which forms the subject of a separate concurrent application for Letters Patent, to which reference may be had for a full description.

The main function of the intermediate vessel, F, is to secure an accurately-regulated and uniform counter-pressure to the liquid in the filter, since the least variation reacts upon the liquid in the filter injuriously by causing foaming, which signifies a separation of carbonic-acid gas from the liquid. Sudden variations in the flow—such as constantly occur at the discharge end of the conduit when receptacles are being filled and removed and replaced by others—cause shocks to the advancing liquid; and if the jarring effect is allowed to extend back to the beer in the filter the disturbance is liable to cause more or less foaming. The intermediate vessel, besides forming a reservoir for the filtered liquid, also serves as a cushion, which takes up the vibrations caused by irregularity in the discharge and prevents their extending back to the filter.

The above is a broad and general outline of the leading features of my invention; but in adapting these features to practical use various auxiliary mechanisms must be supplied, some of which will vary in form under the different conditions to be found in various breweries.

It should be mentioned that the term "shavings-casks," as used throughout this specification, is not intended as a limitation, but is merely expressive of the ordinary source of supply.

It is quite immaterial, so far as my apparatus is concerned, whether the initial clarifying has been effected with the aid of shavings or in some other way. The term "shavings-casks," as here used, implies any vessel from which the liquid is to be drawn, and the term "ultimate receptacle" implies any vessel into which it is to be transferred, and not necessarily the kegs into which it is finally transferred for the market.

The arrangement of parts shown in Fig. 1 is believed to be suitable without change for the majority of modern breweries and adaptable, with but slight changes or omissions, to any brewery. Recent improvements—notably the general introduction of refrigerating-machines—have had a marked influence upon the architecture of breweries. Even storage-cellars are not always to be found in breweries of recent erection, and much of the work that was formerly of necessity conducted on several different floors may now be and frequently is conducted on the same floor. This extends to the finishing-casks and the filtering and filling, and therefore all portions of Fig. 1 of my drawings may be regarded as standing upon a common level, to which situation it is adapted as well as to all other situations.

Fig. 2 shows a modification applicable in cases where the filtering can be conducted upon a lower floor than the filling, in which case the requisite counter-pressure may be obtained by the altitude of the pipe leading to the ultimate receptacle. The latter arrangement is less elaborate than that represented in Fig. 1, and for this reason may often be preferred where the conditions are suitable for its application, notwithstanding the fact that the additional features represented in Fig. 1 possess certain advantages which would be lost.

It may be mentioned that the shavings-casks and the filtering apparatus in the arrangement shown in Fig. 2 may be upon different levels, as represented, or upon a common level, as the construction of the brewery may render the more favorable.

The following is a detailed description of the construction of the entire apparatus:

Each shavings-cask A is provided, preferably, with two discharge-cocks, $q$ and $q'$, one above the other, to which branches $p'$ of the discharge-pipe $p$ may be coupled. Each branch pipe is provided with a stop-cock, $p^2$. This arrangement of a double discharge from the shavings-cask instead of the ordinary single discharge is not a necessary feature of my apparatus, but is desirable for reasons that will appear farther on. The discharge-pipe or hose $p$ leads into the device H, (shown in detail in Fig. 3,) the function of which is to permit the pressure and condition of the beer as it leaves the shavings-cask to be observed, and also to permit its flow to the filter to be regulated or diverted, according to its observed condition. It comprises a four-way casting, $o$, having its lower branch mounted upon a stand, $n$, its lateral branches provided with stop-cocks $m$ and $m'$, and its upper branch surmounted by a receiver, the lower portion, $l$, of which is of metal and the upper portion, $l'$, of which is of glass. The portion $l$ is provided with an inlet, $l^2$, to which the hose $p$ is coupled. The transparent portion $l'$ is surmounted by a pressure-gage, $k$, having an outlet-cock, $k'$, for air leading out of its hollow stem. The lower branch of the four-way casting $o$, or the stand $n$ below it, as shown, is provided with a stuffing-box, $i$, through which a rod, $i'$, passes, which may be moved upward by hand-pressure to raise the ball-valve $h$ from its seat $h'$. A seat, $h^2$, at the top of the reservoir receives the ball when it rises without wholly precluding the passage of air and gas.

Coupled to one of the horizontal branches of the four-way casting $o$ is a hose, $p^3$, branching to the inlets of the filter E. It will be seen by an examination of the pending application for my filter that the inlets are at the end of the horizontal closed cylinder constituting the casing and the outlet at the center through one of the hollow trunnions $g$, upon which it is centrally and pivotally mounted upon standards. The hollow trunnions are continued into the interior nearly to the center, and the filtering agents are at both sides of a central chamber, which chamber is provided with an outlet-cock for drainage on the lower side of the shell. The filter is surmounted by a transparent receiver, $l^2$, pressure-gage $k^2$, and blow-off cock $k^3$. One of the tubular trunnions is connected by a pipe, $g'$, with the main air-reservoir C, and the other is the outlet for the beer on its way to the intermediate-receptacle, F. Both are provided with stop-cocks $q^2$. The liquid-outlet from the filter consists of a pipe, $g^2$, having interposed in it a transparent section, I, and terminating in a draining-cock, $q^3$, below the inlet $q^4$ to the vessel F. The stop-cocks $m'$ and $q^3$, and also the drainage-cock of the filter, discharge into a common pipe, R, branch pipes $x$ being attached where required. In this way the drainage or liquid rejected, owing to its turbidity or for other causes, may be conveniently conducted into a separate receptacle and saved.

The vessel F is designed to receive the beer from the filter under a counteracting fluid-pressure, which may be in the form of carbonic-acid gas from the bunging apparatus, where this can be obtained, or of air from the main reservoir, or both. Provision for obtaining either or both is represented in the drawings, wherein $g^3$ is a pipe for leading gas to the vessel F from the common conduit B of the bunging apparatus, and provided with a stop-cock, $q^5$, and $g^4$ is a pipe for leading air to the same vessel from the main air-reservoir C. The pipe $g^4$ leads into a pressure-reducing valve, K, which forms part of the combined bung, pressure-relief valve, pressure-reducing valve, and pressure-gage L M K N, all the parts of which are of well-known construction, and hence need no particular description, but which I have united, as shown, in a very convenient and effective manner.

The bung L is hollow, with a four-way interior. The pressure-gage N is connected to the upper branch, and the pressure-relief valve M and pressure-reducing valve K to the lateral branches. Between these valves and the bung stop-cocks $q^6$ and $q^7$ are interposed.

Leading out of the bottom of the vessel F is the pipe $g^5$, which is provided with a stop-cock, $q^8$. Where, as in Fig. 2, this pipe leads to a higher floor than that upon which the vessel F rests, whereby the requisite counter-pressure for the prevention of foaming at the ultimate receptacles can be obtained by the hydrostatic pressure due to the altitude of the pipe, it is only necessary that the pipe $g^5$ shall terminate in a cock, $q^9$, to which the usual membranous filling-tube $w$ is connected. Where, however, it is not convenient or desirable to obtain the requisite counter-pressure for the prevention of foaming at the ultimate receptacles by extending the pipe $g^5$ to a sufficient altitude, as represented in Fig. 2, this counter-pressure, to secure the best results, must be obtained in some other way. I obtain it by means of compressed air, and for this purpose employ the vessel Q, provided with a combined bung, pressure-relief valve, pressure-reducing valve, and pressure-gage L M N K, in all respects like the corresponding device on the intermediate vessel, F, and similarly connected through the pressure-reducing valve K with the main air-reservoir C through a pipe, $g^7$. The construction embracing the vessel Q is represented in Fig. 1, and is as follows:

Interposed in the pipe $g^5$, near its terminus, is a transparent section, I', and beyond this transparent section the pipe divides into two branches by means of the branched connection O, which is secured to a suitable support, and is provided at its lower ends with stop-cocks $q^{10}$. Flexible pipes $g^6$ connect the branches of the connection O with the elbows $y$ upon the upper ends of the metallic filling-tubes which pass through the filling-bungs P, and these elbows are each provided with an air-cock, $z$.

The filling-bung P (shown in detail in Figs. 4 and 5) comprises the tubular body $f$, the passage through which is of the same size above the point $f'$ as the filling-tube $f^2$, and below that point is enlarged, as shown at $f^3$, to afford an annular space between the filling-tube and the wall of the bung. The lower portion of the bung is provided with a packing, $f^4$, to cause it to fit snugly in the bush, and the upper end is recessed and threaded, as shown, to receive a packing-ring, $f^5$, and screw-collar $f^6$. By screwing down the collar $f^6$ the packing $f^5$ is caused to contract about the tube $f^2$, thus producing a close fit. The bung is provided with handles $f^7$ for convenience in removing and replacing it. Leading out of the upper part of the enlarged portion $f^3$ of the passage through the bung is a faucet, $f^8$, which serves both as a vent and overflow.

The vessel Q is provided with a T-cock, $e$, from which pipes $d$ branch to the faucets $f^8$ of the two filling-bungs P, and in each pipe $d$ a transparent section, $c$, is interposed for purposes of observation. This duplication of the filling devices, while desirable, as will be explained farther on, is not a necessary feature. If desired, the device may be single instead of double from the point where the transparent section I' is shown to the vessel Q. A faucet, $q^{11}$, at the lower end of the vessel Q permits all liquid accumulating therein to be drawn off.

The operation of the apparatus is as follows: The shavings-cask A is always one of many, depending in number upon the capacity of the brewery. If the cask is one of a series connected together by a bunging apparatus, the communication with the common conduit B is cut off preparatory to racking. Communication with the auxiliary air-reservoir D through the pipe $t'$ is then opened, and also communication between the main reservoir C and the filter E through the pipe $g'$, all the outlets of the filter being closed except those leading back to the shavings-cask, which latter are opened, so that the air-pressure may extend through the pipe $p$ to the outlet-faucet of the shavings-cask. The pressure of air in the filter will be indicated by the pressure-gage $k^2$, and after closing the cock $q^2$ may be reduced to the desired degree by opening the cock $k^3$ or some one or more of the various drainage-cocks of the filter; or, if desired, a pressure-reducing valve—such as is shown at K—may be attached to the air-trunnion $g$. The pressure of air in the filter extending back through the foam-indicator H and pipe $p$ prevents foaming upon the opening of the outlet-cock of the cask A, which would otherwise occur. The cock $m$ is then closed, the outlet-cock from the cask A opened for the discharge of the liquid, and the air-escape cock $k'$ at the upper end of the foam-indicator opened to allow all the air to be forced out by the advance of the liquid. The rod $i'$ is then raised to remove the ball $h$ from the valve-seat $h'$ and the cock $m'$ is opened to permit the first liquid, which is generally very turbid, to escape. When all the air has escaped from the foam-indicator H, the ball $h$ will float to the upper valve-seat, $h^2$, and close the opening, thus preventing escape of the liquid. The cock $k'$ is then closed. If any air subsequently accumulates in the receiver $ll'$, it will cause the ball $h$ to descend from its seat, following the level of the liquid, and may be let off by opening the cock $k'$. As soon as the most turbid beer has been run off into a suitable receptacle the cock $m'$ is closed and the cock $m$ opened, thus admitting the beer to filter, the various cocks on the upper side of which (described in my application for a patent for the filter) are left open for a sufficient time to allow the air to escape and secure a steady flow of the liquid until the filter becomes full of the latter. It is preferable to close them in succession as the liquid advances.

If any other form of filter is substituted in the system for the one referred to, a proper use of the same to effect the object just described will readily suggest itself. When the filter is full, the cocks $q^2$ and $q^4$ are opened, allowing the beer to pass into the intermediate vessel, F, which has been previously prepared to receive it under a suitable counter-pressure.

To prepare the vessel F to receive the liquid from the filter, it is filled with air from the main reservoir C, by way of the pipe $g^4$ and pressure-regulator K, to a pressure somewhat below that at which the beer leaves the filter. To do this the cock $q^6$ is opened, the cock $q^7$ being left closed, and the pressure-regulator K adjusted until the pressure-gage N shows the desired pressure. The cock $q^6$ is then closed and the cock $q^7$ opened. Weights are then removed from the pressure-relief valve M until air begins to escape therefrom. One weight is then replaced and the cock $q^6$ reopened, when it will prevent the pressure from varying more than one-half pound, and the vessel F is ready for the admission of liquid from the filter. If the pressure of about six or seven pounds, which is the usual normal pressure of the bunging apparatus, is suitable for the counter-pressure, the vessel F may be placed in direct communication with the common conduit B of the bunging apparatus by opening the cock $q^5$ in the pipe $g^8$, thus admitting carbonic-acid gas instead of air to the vessel F to produce the desired counter-pressure. If it is desired to reduce the pressure of carbonic-acid gas below the normal pressure in the bunging apparatus, which might be the case, particularly where the filter is upon the same level with the shavings-cask, this may be done by interposing a pressure-reducing valve in the pipe $g^3$. Of course where the filter is upon a lower level than the shavings-cask the pressure of the beer which passes through the filter becomes augmented in proportion to the distance of fall; but in any event it is obvious that the pressure passing through the filter may be regulated to a pressure above the normal pressure of the bunging apparatus within certain bounds by adjusting the pressure of air in the auxiliary air-reservoir D through the medium of the pressure-reducing valve $r$. Whether air or carbonic-acid gas constitutes the counter-pressure in the vessel F, or whether both are employed conjointly, the pressure-relief valve M and pressure-gage N would be essential adjuncts.

The condition of the beer in its progress from the shavings-cask to the vessel F may at all times be observed through the transparent sections $l'$, $l^2$, and I. From the vessel F the beer is transferred to the ultimate receptacles by way of the pipe $g^5$.

The operation where the form of filling device represented in Fig. 2 is employed has already been sufficiently described. In that case the counter-pressure, to prevent foaming at the kegs or bottles, is the hydrostatic pressure resulting from the altitude of the pipe $g^5$, which is understood to extend to a higher floor than that upon which the vessel F is located. The operation of the filling device represented in Fig. 1, however, requires further explanation. In this case the filling is done against a counteracting air-pressure, properly from three to four pounds lower than the air or gas pressure in the vessel F. This counter-pressure is obtained from the vessel Q, which is filled to the proper pressure by way of the pipe $g^7$ in precisely the manner that has been described for the vessel F. Upon connecting a keg, G, to the bung P the cocks in the pipes $d$ are first opened, thus filling the keg with air to the same pressure as the air in the vessel Q. The liquid-cock is then opened, when the liquid enters the keg, displacing the air therein and driving it back to the vessel Q, from which the surplus may escape by way of the pressure-relief valve M. Thus foaming at the keg is prevented. When, by observation of the glass section $c$, overflow is detected, the supply of liquid is shut off, the cock $f^8$ shut, the bung loosened in its bushing and raised part way out of the keg, which may easily be done owing to the flexibility of the supply-pipe $g^6$, and the small air-cock $z$ opened to admit exterior air to the tube $f^2$, so that upon the withdrawal of that tube the liquid contained in it may enter and fill the keg. After the withdrawal of the bung and filling-tube the keg is bunged and removed. The overflow passes down through the pipe $d$ into the vessel Q, which for this purpose should be located at a somewhat lower level than the kegs G. From the vessel Q it may be drawn off through the cock $q^{11}$ and saved, and for this purpose the pipe R may extend to the cock also, if desired, provided the location is convenient. In this way neither gas nor beer is lost to an appreciable extent. By duplicating the filling device, as shown and described, kegs may be filled alternately from both branches, and the operation thus made continuous.

Instead of drawing the beer from the shavings-cask through a single outlet-cock in the usual way, which may of course be done, decided advantages will be obtained by employing the two outlets $q$ $q'$ from each shavings-cask and the branch pipes $p'$ of the pipe $p$, which are used in the following manner:

On beginning to filter the contents of the cask A the upper cock, $q'$, only is opened, and when the liquid in the cask has very nearly reached the level of this cock the lower cock, $q$, is opened and the cock $q'$ closed. In this manner the more turbid liquid will be let off last instead of first, as by the old method. While the liquid is passing off from the lower cock, $q$, the upper branch pipe is detached from the cock $q'$ and connected to the corresponding upper cock of the adjacent shavings-cask, next to be racked off. When the first shavings-cask is nearly empty, the cock on the second shavings-cask corresponding to $q'$ is opened and the cock $q$ closed. The branch pipe $p'$ is then detached from the latter cock and connected to the corresponding cock of the next shavings-cask, which is opened, as in the case of the other shavings-cask, when the liquid has nearly reached the level of the upper cock. Cocks $p^2$, which may be placed as near the ends of the branch pipes as desired, serve to prevent ingress of air during transfer.

By conducting the drawing off as above the pipes are always full of liquid and the flow to the filter is continuous, thus avoiding the trouble heretofore experienced when one of the casks was emptied and the connections made for another. This change of connection, as a rule, affected the work of every filter, since the process of filtration was necessarily stopped during this time, and when the filtration of the new cask just connected began the apparatus would not filter the liquid clearly, owing to the fact that the flow was momentarily stopped, and a considerable quantity of air was then contained in the leading-pipes. Obviously no such difficulty can arise if my arrangement of parts is employed as above defined. The branch pipes $p'$ will be found advantageous even where only one outlet from each cask is employed, since they enable an uninterrupted flow to be secured.

What I claim as new, and desire to secure by Letters Patent, is—

1. In an apparatus for filtering liquids under pressure, the combination, with the vessel containing the liquid and with the outlet-pipe and filter, of a reservoir for containing an aeriform fluid under pressure controllably communicating with the filter, whereby the filter and its connections with the vessel containing the liquid may be supplied with such aeriform fluid under pressure to afford a yielding resistance to the advancing liquid, substantially as described.

2. In an apparatus for filtering and filling liquids under pressure, the combination, with the supply-vessel, discharge-conduit, and filter, of a vessel, F, interposed in the discharge-conduit between its outlet end and the filter and provided with a suitable vent, and a reservoir for an aeriform fluid under pressure controllably communicating with the interposed vessel, whereby the liquid in its progress enters the said vessel against a counteracting pressure of aeriform fluid, substantially as described.

3. In an apparatus for filtering and filling liquids under pressure, a filter and an intermediate vessel interposed in the conduit leading from the supply-vessel to the ultimate receptacles, and each provided with a suitable vent and communicating controllably with a reservoir for an aeriform fluid under pressure, substantially as described.

4. In combination with the vessel A and conduit leading therefrom to the ultimate receptacle, a filter interposed in the said conduit, a vessel also interposed in the said conduit, a suitable vent upon the said vessel, a reservoir for aeriform fluid under pressure controllably communicating with the said vessel, and counter-pressure mechanism between the said vessel and ultimate receptacle, substantially as described.

5. The combination, with the vessel A, of the main air-reservoir C, auxiliary reservoir D, a conduit connecting the two reservoirs, a pressure-reducing valve, $r$, in the said conduit, a conduit connecting the reservoir D with the upper part of the vessel A and provided with a valve, the discharge-conduit for beer leading from the vessel A, filter E, interposed in said discharge-conduit, and counter-pressure mechanism acting upon the filter, substantially as described.

6. The combination, with the vessel A, air-reservoir for forcing compressed air upon the surface of the beer in the vessel A, and discharge-conduit for beer leading from the vessel A, of the filter E, interposed in the said discharge-conduit, a vessel, F, beyond the filter and communicating therewith by means of the discharge-conduit and provided with a vent, and counter-pressure mechanism operating to retard the flow of liquid to and through the filter, substantially as described.

7. In an apparatus for filtering and filling liquids under pressure, a transparent receptacle interposed in the discharge-conduit between the supply-vessel and the filter and provided with a branch outlet, both the branch outlet and conduit being provided with stop-cocks, substantially as described, whereby the flowing liquid may be inspected on its way to the filter and diverted therefrom, if desired.

8. The foam-indicator H, comprising, in combination, the receiver $l\,l'$, in part transparent and provided with the upper and lower seats, $h^2$ and $h'$, for the ball-valve $h$, and with the pressure-gage and air-outlet $k\,k'$ and liquid-inlet $l^2$, and the four-way casting $o$, having its lateral branches provided with cocks $m\,m'$, and the rod $i'$, entering the vertical branches through a stuffing-box, $i$, substantially as described.

9. The four-way bung L, provided on its three upper branches with a pressure-gage, a pressure-reducing valve, and a pressure-relief valve, and having stop-cocks $q^6$ and $q^7$, substantially as described.

10. The combination, with the vessel A, air-reservoir, filter, and connecting-pipes suitably provided with stop-cocks, of the pipe $g'$, connecting the filter with the air-reservoir and provided with a valve for controlling the flow, substantially as described.

11. The vessel F, interposed in the discharge-conduit of the vessel A and provided with a pressure-relief valve, in combination with a pipe, $g^3$, connecting the vessel F with the common conduit B of the bunging apparatus and provided with a valve for controlling the flow, substantially as described.

12. In combination with the vessel A and its discharge-conduit and with the air-reservoir communicating with the vessel A, the vessel F, interposed in the discharge-conduit and provided with a pressure-relief valve and pressure-gage, and the pipe $g^4$, connecting the vessel F with the air-reservoir and provided with a pressure-regulating valve, substantially as described.

13. The filling-bung P, comprising the body $f$, having its internal passage enlarged below a point, $f'$, packing $f^5$, screw-collar $f^6$, and outlet $f^8$, provided with a stop-cock, in combination with the tube $f^2$, having the air-cock $z$, substantially as described.

14. In combination with the discharge-conduit of the vessel A, the T-cock O, branches $g^6$ and $g^7$ of the discharge-conduit, filling-bungs P upon the separate branches, vessel Q, provided with the T-cock $e$ and with the pressure-gage N and the pressure-relief valve M, and pressure-reducing valve K, having suitable stop-cocks, pipes $c\,d$, connecting the filling-bungs with the T-cock $e$, air-reservoir C, and pipe $g^7$, leading from the air-reservoir to the pressure-reducing valve K, substantially as described.

15. The discharge-conduit $p$, having at its ingress end the branches $p'$, provided with stop-cocks $p^2$, whereby separate supply-vessels may be successively emptied without interruption of the flow, substantially as described.

16. The combination of the cask A, a receptacle into which the beer in the cask A is to be transferred, and a discharge-conduit, $p$, connecting the cask A with the said receptacle, and provided at its ingress end with two branches, $p'$, having stop-cocks $p^2$, whereby one of said branches may be connected to an adjacent cask before the other is detached from the cask A, and the discharge thus rendered continuous, substantially as described.

17. The vessel A, provided with discharge-cocks $q\ q'$ at different levels, in combination with the discharge-pipe $p$, having separate branches $p'$, provided with stop-cocks $p^2$, substantially as described.

OTTO ZWIETUSCH.

In presence of—
OSCAR B. ZWIETUSCH,
HENRY SCHINZ.